May 22, 1923.
A. J. MAIER
PICTURE HANGER
Filed June 19, 1922
1,455,961
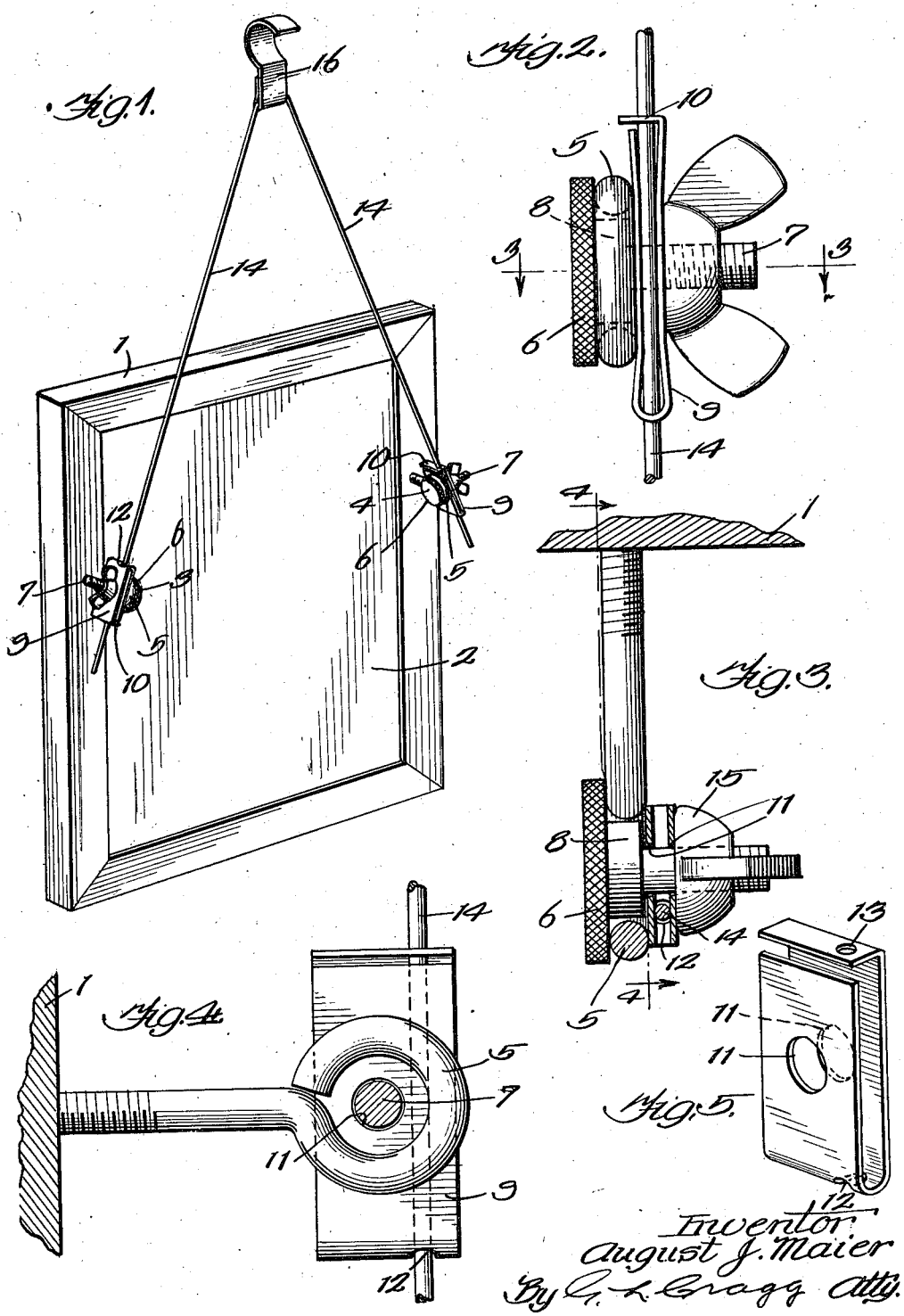

Patented May 22, 1923.

1,455,961

UNITED STATES PATENT OFFICE.

AUGUST J. MAIER, OF CHICAGO, ILLINOIS, ASSIGNOR TO DEXTER MANUFACTURING COMPANY, OF CHICAGO, ILLINOIS, A CORPORATION OF ILLINOIS.

PICTURE HANGER.

Application filed June 19, 1922. Serial No. 569,311.

*To all whom it may concern:*

Be it known that I, AUGUST J. MAIER, a citizen of the United States, residing at Chicago, in the county of Cook and State of Illinois, have invented a certain new and useful Improvement in Picture Hangers, of which the following is a full, clear, concise, and exact description.

My invention relates to hangers and is of particular service when employed for supporting picture frames and the like, though the invention is not to be limited to any particular use to which it may be put.

The hanger of my invention comprises an eye having a mounting stem, a bolt having a threaded stem, a mounting for the bolt, a clamp upon the bolt stem, a wire held by the clamp and a nut upon the bolt stem engaging the clamp.

In the preferred embodiment of the invention the mounting for the bolt is in the form of a screw eye, the stem of the bolt passing through the screw eye. When a screw eye is employed as a mounting for the bolt the bolt is provided with a head to keep it from passing through the screw eye.

The invention will be more fully explained by reference to the accompanying drawing in which Fig. 1 is a perspective view illustrating a picture frame having two hangers constructed in accordance with the preferred embodiment of the invention; Fig. 2 is an end view of one of the hangers; Fig. 3 is a sectional view on line 3—3 of Fig. 2; Fig. 4 is a side view of one of the hangers, and Fig. 5 is a perspective view of a clamp which is preferably employed.

Like parts are indicated by similar characters of reference throughout the different figures.

I have illustrated a frame 1 that contains a picture or other element 2. Two hangers are illustrated at 3 and 4 for supporting the frame. Each hanger includes a screw eye 5 which is screwed into a side rail of the frame. A bolt is employed in each hanger, this bolt having a head 6 and a threaded stem 7. The bolt stem 7 passes through the loop of the screw eye to an extent limited by the bolt head. The bolt stem is desirably enlarged as indicated at 8 to fill the loop of the screw eye. The stem of the bolt of each hanger passes through a clamp 9 which is preferably formed of strip metal bolted into U-shape and having one end portion 10 bent toward the other end portion of the clamp. The side walls of each clamp are formed with registering openings 11 through which the stem of the corresponding bolt passes. A hole 12 is formed in the bight of the clamp and another hole 13 is formed in the bent end portion of the clamp. The wire 14 is assembled with each by being passed through the holes 12 and 13 thereof. A wing nut 15 is screwed upon each bolt stem and serves to press the side walls of the corresponding clamp together to grip the wire. The two wires 14 may be in the same piece and may be connected with the same hook 16, or these wires may be separate, each having an individual hook, as will be well understood. The wires are preferably rigid so that it will not be necessary to use a step ladder to hang the hooks upon the picture moulding.

It will be seen that the connection at the lower ends of the wires with the picture frame is adjustable in various directions by reason of the devices which are employed to assemble the wires with the picture frame. Thus the lower end of each wire may be adjusted upon the axis of the corresponding screw eye by turning the screw eye. The wire may be adjusted in a plane parallel to the axis of the screw eye by turning its clamp upon the corresponding bolt stem.

The length of the wire between its hook and the clamp may be readily adjusted when the bolt nut is loosened to permit the wire to be moved up and down through its clamp, the bolt nut being tightened when the desired adjustment has been effected.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A hanger including a screw eye; a headed bolt having a threaded stem passing through the loop of the screw eye; a clamp formed of strip metal folded into U-form and having one end portion bent toward the other, this clamp being formed with registering holes in its sides through which said bolt stem passes and with a hole in its bight and another in the bent end portion; a wire passing through the latter two holes; and a nut upon the bolt stem for operating the clamp.

2. A hanger including an eye having a mounting stem; a headed bolt having a threaded stem passing through the eye; a clamp formed of strip metal folded into U-form and having one end portion bent toward the other, this clamp being formed with registering holes in its sides through which said bolt stem passes and with a hole in its bight and another in the bent end portion; a wire passing through the latter two holes; and a nut upon the bolt stem for operating the clamp.

3. A hanger including a screw; a bolt having a threaded stem; a mounting for the bolt; a clamp formed of strip metal folded into U-form and having one end portion bent toward the other, this clamp being formed with registering holes in its sides through which said bolt stem passes and with a hole in its bight and another in the bent end portion; a wire passing through the latter two holes; and a nut upon the bolt stem for operating the clamp.

In witness whereof, I hereunto subscribe my name this 14th day of June A. D. 1922.

AUGUST J. MAIER.